United States Patent [19]

Nicolas

[11] Patent Number: 4,697,218

[45] Date of Patent: Sep. 29, 1987

[54] OVERCURRENT PROTECTION DEVICE

[75] Inventor: Bernard Nicolas, Avon, France

[73] Assignee: Service National Electricite De France, Clamart, France

[21] Appl. No.: 633,882

[22] Filed: Jul. 24, 1984

[30] Foreign Application Priority Data

Jul. 25, 1983 [FR] France .................. 8312264

[51] Int. Cl.⁴ .................................. H02H 3/093
[52] U.S. Cl. ............................... 361/87; 361/94; 361/100; 361/110
[58] Field of Search .................. 361/93, 94, 98, 97, 361/87, 110

[56] References Cited

U.S. PATENT DOCUMENTS

4,208,692 6/1980 Rohr ........................ 361/110 X
4,255,774 3/1981 Breen ....................... 361/110 X
4,423,458 12/1983 Stich ........................ 361/93
4,432,031 2/1984 Premerlani ................. 361/97

Primary Examiner—A. D. Pellinen
Assistant Examiner—H. L. Williams
Attorney, Agent, or Firm—Larson and Taylor

[57] ABSTRACT

The device, for AC operation, is applicable more especially to the protection of very high tension installations. It comprises a rectifier (12), a comparator for comparing the rectified current and a threshold value (s) and for making, in the case of overshoot, a new comparison after a time equal to and $\frac{1}{2}T+\Delta T$, T being the nominal period of the AC current and $\Delta T$ a fraction of T of the order of a tenth, after overshoot. The new comparison is made with a circuit comprising a memory (22), a timer (24) and a circuit (34) including two inverters and an AND gate. Tripping is produced if overshoot occurs during the new comparison.

5 Claims, 10 Drawing Figures

OVERCURRENT PROTECTION DEVICE

BACKGROUND AND SUMMARY OF THE INVENTION

The invention relates to a selective overcurrent protection device, intended for AC operation; it is particularly suitable for protection of very high voltage systems (for instance the 400 KV voltage system of the French national grid system) against short circuits.

A disadvantage of existing protection devices is a possibility of actuation not only by a short circuit current but also by the intense magnetizing current surge under transitory conditions when large machines, particularly high power transformers, are switched on. Consequently, such existing devices may be triggered untimely at switch on of the transformers if a relatively low protection level is desired, that is to say corresponding to a low value of short circuit current. This untimely operation imposes on the transformers additional stresses because of a number of switch-ons greater than normal and cause premature wear of the protecting circuit breakers, due to the increased number of useless operations.

It is an object of the invention to provide a selective protection device, providing rapid discrimination between the two types of current likely to appear; it is a more specific object to make it possible to select a low protection level without a risk of numerous untimely tripping operations.

Figure 1:
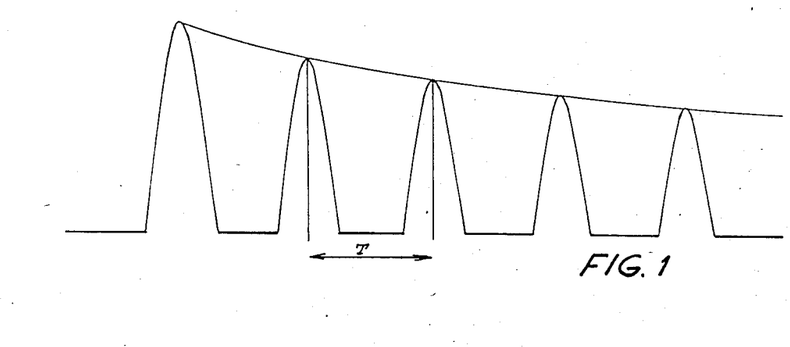

For that result, the invention uses the fact that the variation in time of magnetizing currents under transitory conditions is very different from the trend of the short circuit currents under steady and transitory operating conditions. As shown in FIG. 1, the curve representing the value of a magnetizing current under transitory conditions, as a function of time t, is formed of half waves of high amplitude separated by practically zero half waves of the opposite sign. The envelope of the peaks of the half waves decreases and tends towards zero when approaching permanent conditions.

On the contrary, the short circuit current under steady (established) conditions, (FIG. 2) is represented by a sine function. Consequently the same amplitude in absolute value occurs repeatedly at time intervals T/2 (T being the period i.e. 20 ms for a 50 Hz AC current).

The problem is however much less simple than appears at first sight, for the short circuit current may occur under transitory conditions. The maximum asymmetry corresponds to a variation of the current as a function of time of the type:

$$I = Im\left[\sin\left(\omega t - \frac{\pi}{2}\right) + \exp\left(-\frac{t}{\tau}\right)\right]$$

Figure 3:
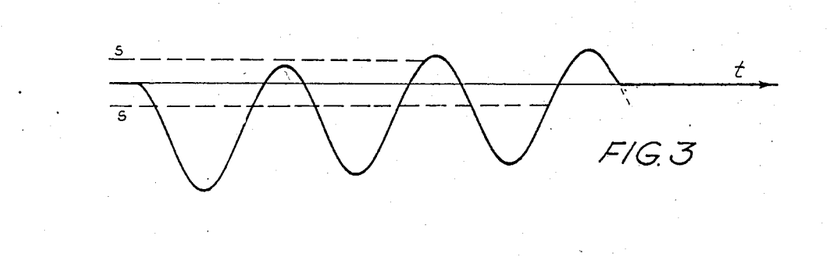

The second term is significant only during an initial period of build-in. Refering to FIG. 3, it is seen that function becomes equivalent to that representing the fault current under established conditions as soon as t exceeds about $5\tau$.

It could have been presumed that the possible existence of totally asymmetric operating conditions at cut-in would set aside a discrimination based on the difference of trends of the short circuit currents under permanent operating conditions and of the magnetizing current. A protection device in accordance with the invention, for satisfactory discrimination despite the possibility of such a situation, comprises a full wave rectifier, means for comparing the rectified current and a threshold value and for making a new comparison, if the rectified current exceeds the threshold, after a time equal to $T/2 + \Delta T$ (T being the period of the AC current and $\Delta T$ a fraction of T of the order of one tenth) after the threshold was exceeded and means for tripping the device should the overshoot be renewed during the new comparison.

The invention will be better understood from the following description of a particular embodiment thereof, given by way of example only

SHORT DESCRIPTION OF THE DRAWINGS

FIGS. 1, 2 and 3 already mentioned, are diagrams representing the trend of the variation of the magnetizing current under transitory conditions, of the short circuit current under permanent conditions and of the short circuit current under asymmetric conditions during cut-in.

DETAILED DESCRIPTION OF A PARTICULAR EMBODIMENT

Figure 2:
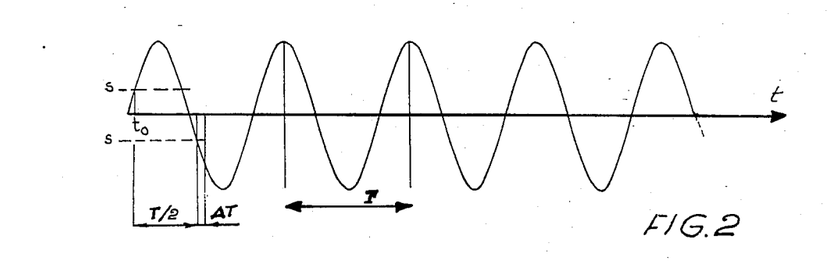

Referring to FIG. 2, operation of the device will be summarized. The device is designed for detecting, at time $t_o$ the overshooting of the threshold or set value s by the intensity of the current. This time $t_o$ marks the beginning of a time delay $\frac{1}{2}T + \Delta T$, T being the nominal period and $\Delta T$ a time interval which will be usually chosen at a value equal to about 10% of the period. Thus, the duration of the time delay will be 11 ms for a 50 Hz grid network where, under established operating conditions, the same absolute value is found every 10 ms. Ideal conditions for tripping occur with a short circuit current of the kind shown in FIG. 2, where the half waves are symmetrical. The device will then operate 11 ms after detecting a first overshoot of the threshold.

If the ratio between the fault current and the effective value of the threshold current is sufficiently high (>2), the device also operates rapidly. On the other hand, if this ratio is less than 2, its operation may be delayed by a few periods and will also depend on the time constant of the installation (a low L/R causes more rapid operation). In practice, it has been discovered that the extension of the response time only becomes appreciable when the rms value of the rms fault current is not very much greater than the threshold value, which represents a minor drawback, since the protection level is low. As soon as the ratio between the rms value of the fault current and the value of the threshold current exceeds 1.5, the response time drops to a value of the order of 15 ms for a 50 Hz current.

Figure 4:
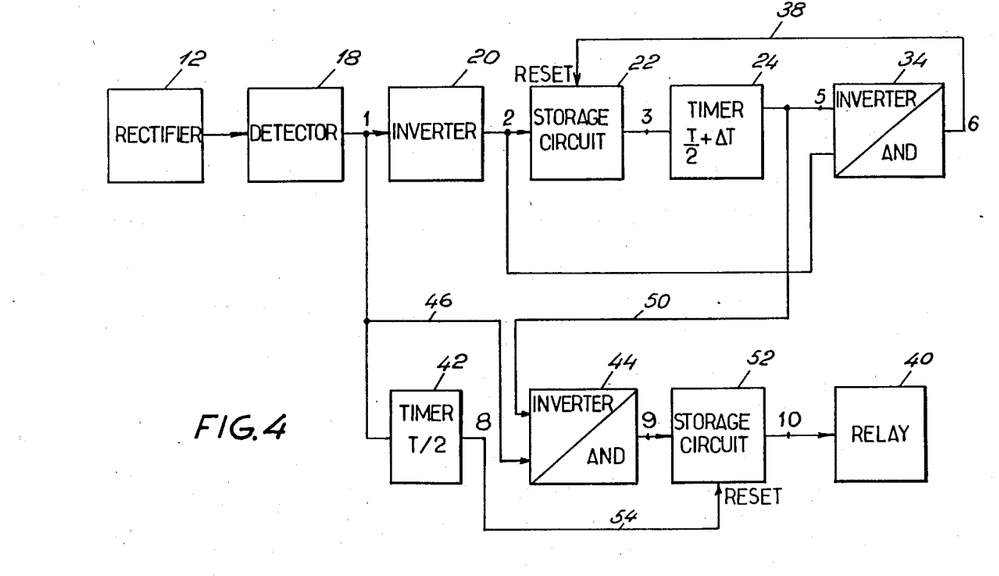
FIG. 4 is a block diagram of a device according to the invention.
Figure 5:
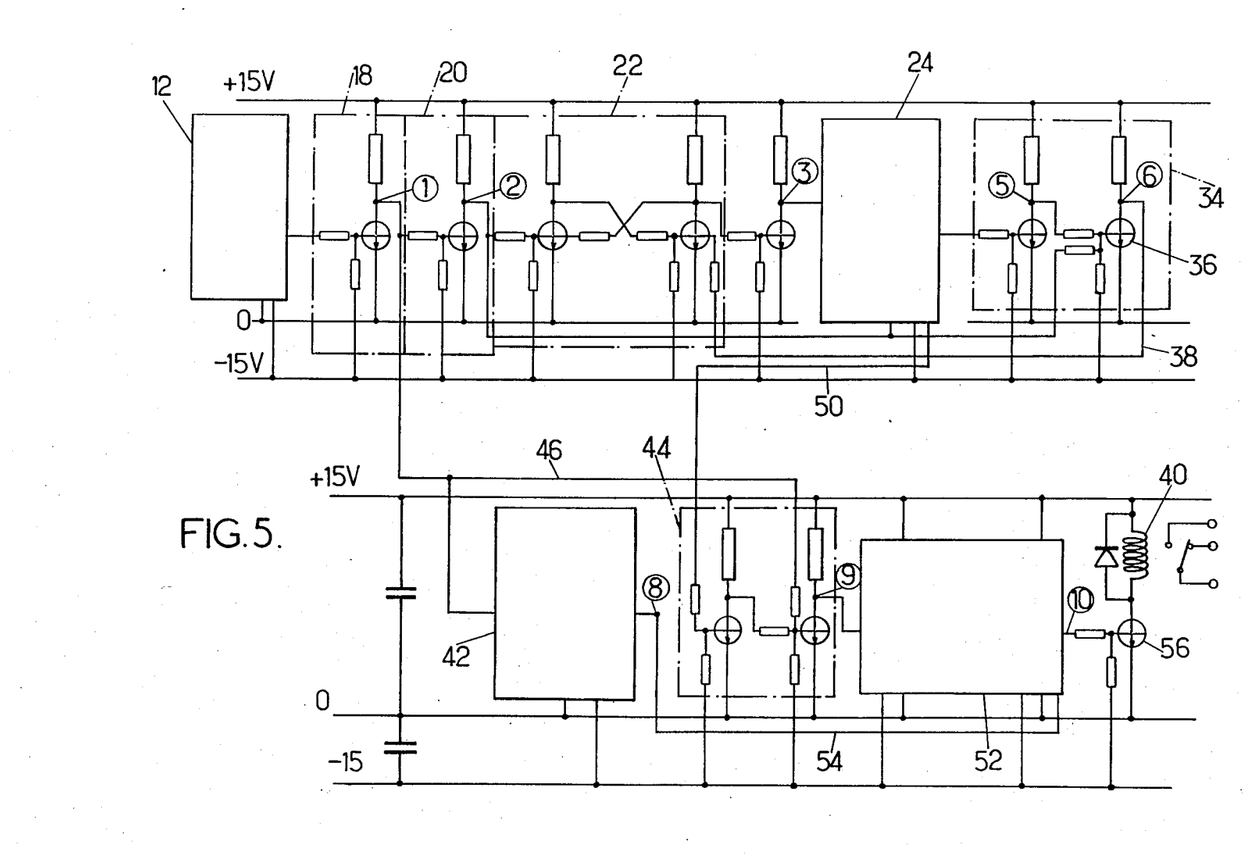
FIG. 5 is a diagram showing a possible construction of the blocks of the diagram of FIG. 4.
Figure 6A:
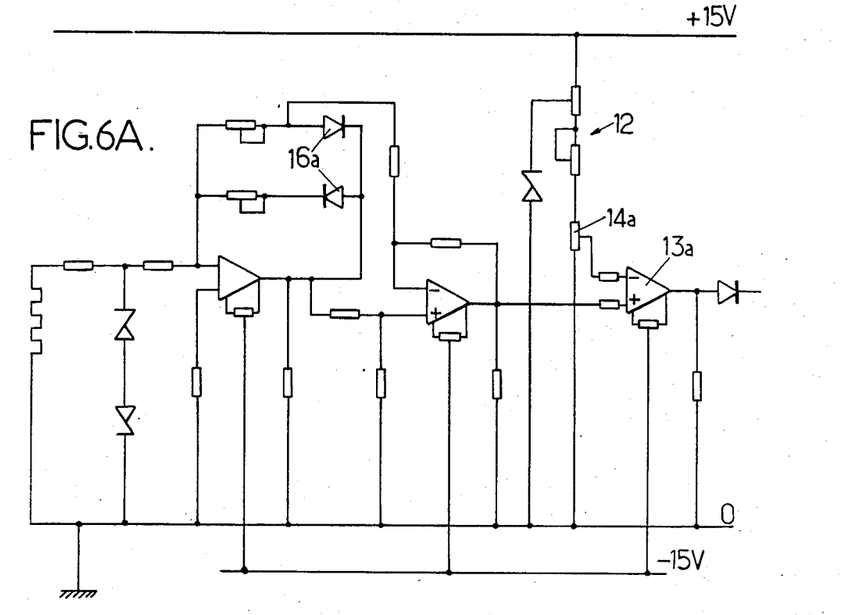
FIGS. 6A and 6B are diagrams of the detector and of the timers of FIG. 5.

The device shown in FIG. 4 in block form and whose construction, formed from static elements fed with voltages of +15 V and −15 V, is given in FIG. 5, comprises an input element formed by a detection and rectifier circuit or detector 12 which receives an input current from a current transformer mounted in the line to be monitored. This detector 12 comprises a differential-connected operational amplifier 13a (FIG. 6a) for providing an output signal during the time intervals when the current in the line to be monitored exceeds a threshold value adjustable by means of a potentiomer 14a (FIG. 6a). The voltage threshold chosen will be generally very small, typically between 0 and 1 V. Consequently, the associated rectifier circuit must be sufficiently sophisticated so that the forward voltage of the rectifier diodes does not introduce any error.

Figure 6B:
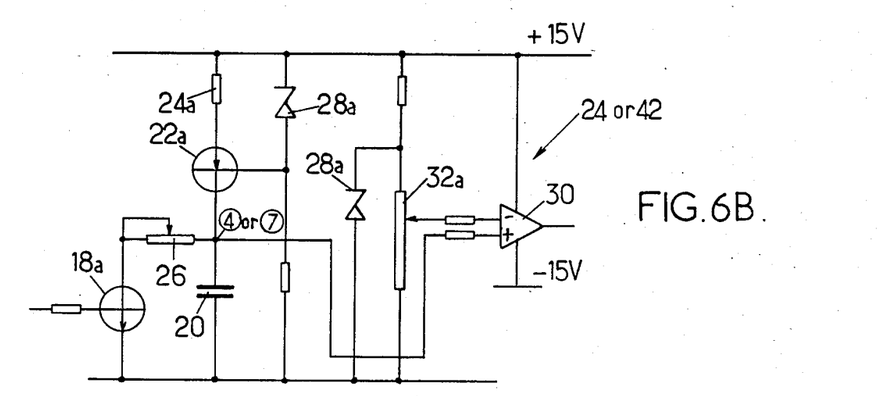

The circuit shown in FIG. 6a may in particular be used, having two branches each comprising a diode 16a. The rectifier and detector circuit 12 drives a detection circuit in logic form 18 (FIGS. 4 and 5) supplying alternately a zero output voltage or an output voltage equal to the supply voltage (+15 V in the case illustrated), but complementary. An inverter circuit 20 (FIGS. 4 and 5), situated at the output, comprising as the preceding one a transistor which is alternately disabled and saturated, provides at its output a logic signal of polarity adapted to driving a storage circuit or latching memory 22. This circuit is again formed by transistors alternately disabled and saturated, for example a flip-flop consisting of NPN transistors of 2N 2221A type. This latching memory 22 in its turn drives a timer 24 of duration $\frac{1}{2}T+\Delta T$. This timer 24 may be constructed as shown in FIG. 6b and comprises a transistor 18a, which, depending on whether it is off or on, short-circuits capacitor 20a or allows it to be charged by a constant current through a second transistor 22a. So as to have for example a voltage of 4 V at the terminals of capacitor 20a, a resistor 24a of 120K ohms is located in the charge circuit. A potentiometer 26a will be generally placed in the discharge circuit of capacitor 20a, so as to avoid transfer oscillation of the charges. The operational output amplifier 30a, having a Zener voltage of 5.1 V for example, passes from the −15 V state to the +15 V state as soon as the voltage at the terminals of capacitor 20a assumes a value greater than a reference voltage adjustable by means of a potentiometer 32a.

The timer 24 and detector 20 drive a circuit 34 comprising an inverter for each of two inputs thereto and an AND circuit driven by those two inverted inputs. The output transistor 36 of circuit 34 is alternately disabled and saturated. The output of the circuit 34 is fed back through a conductor 38 to the reset input of store 22.

The part of the device formed by circuits 20, 22 and 24 and 34 may be regarded as providing discrimination. The electromagnetic output relay 40 for effecting the tripping is controlled by a second branch which comprises a timing input circuit 42 identical to circuit 24 but with a time delay T/2, and a test circuit 44 formed by a circuit formed in the same way as circuit 34. This circuit 44 receives the direct signal coming from circuit 18, before the time delay, over a conductor 46 and the output signal of the timer 24 over a conductor 50. The purpose of the time delay circuit 42 is to control the resetting of a store 52, identical to store 22, by means of a conductor 54. Finally, the output of the store drives relay 40 through a switching transistor 56.

Figure 8:
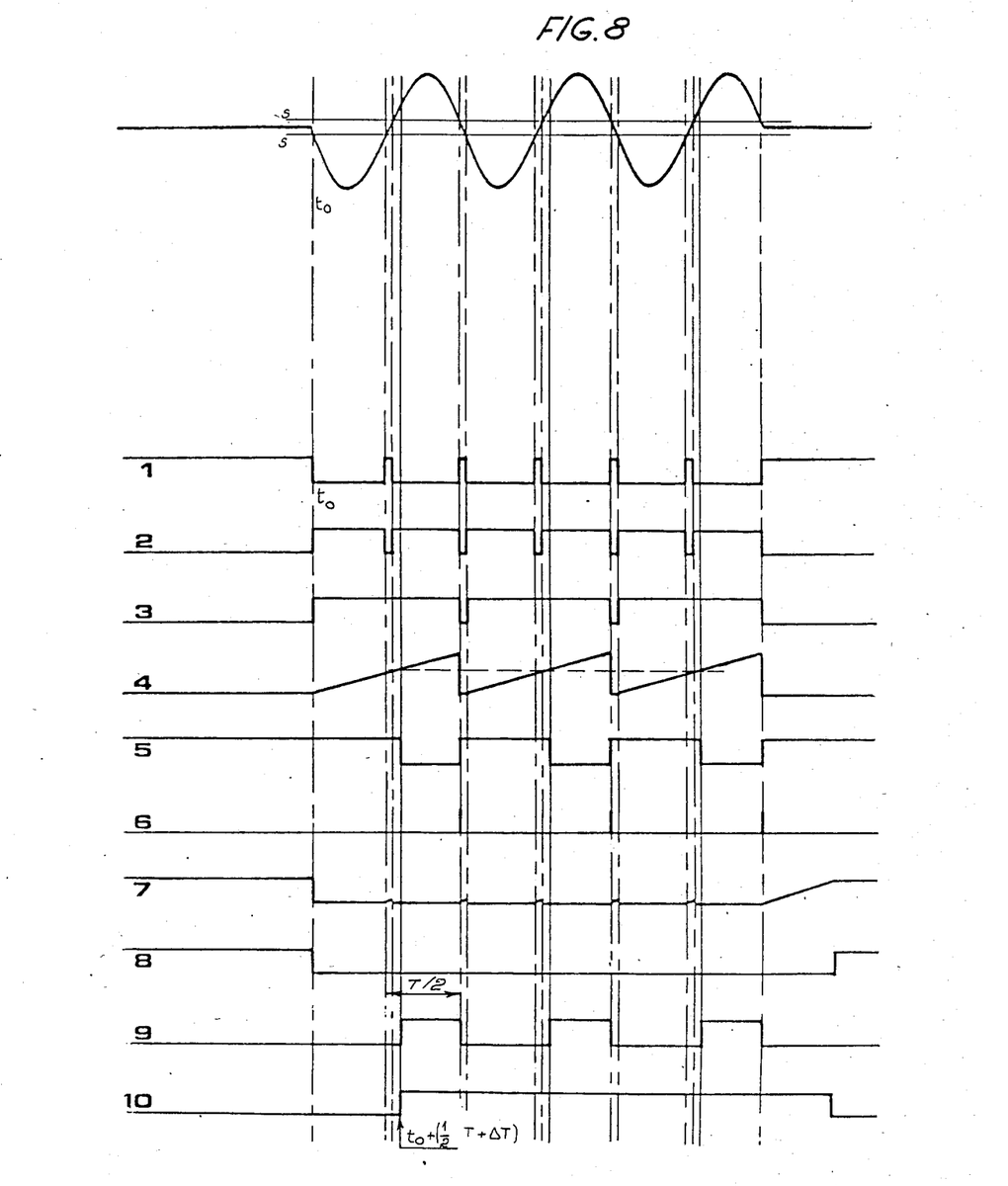

The operation of the device during a short circuit current under permanent conditions, that is to say in the most favorable case, is illustrated in FIG. 8. The lines situated on each side of the point of origin of the trace determine the "set" point of the protection.

At time $t_o$ when the current rises over the threshold s for the first time, there is a reversal of the outputs of detectors 18 and 20 (lines 1 and 2). The change of logic level at point 2 is written into memory 22 at time $t_o$ (line 3). The change of logic level at the output of memory 3 causes charge of capacitor 20 of the timer 24, by a current of predetermined and constant value. The switching threshold of timer 24 is selected to provide a time delay $(\frac{1}{2})T+\Delta T=11$ ms. Consequently, the logic level at the output of timer 24 changes at time, $t_o+11$ ms. Meantime, the outputs of circuits 18 and 20 reverted to their initial condition during the time delay during which the value of the current is less than the threshold, then were again inverted, so that during the time delay until point 5 changes its logic level the circuit 34 have both its inputs simultaneously energized at logic level "0". It consequently does not deliver a "clear" output over line 38.

Concurrently, timer 42, providing a time delay $T/2=10$ ms, was started up at time $t_o$. But the capacitor 20 of this circuit 42 is charged for a time limited to the time period during which the current is less than the threshold (line 7). Thus, circuit 42 can at no time supply a "clear" signal to memory 52 and the same will happen during the following half waves. At the first half wave which follows the one during which the current exceeded the threshold, at time $t_o+\frac{1}{2}T+\Delta T$, both inputs of the circuit 44 receive signals from points 1 and 5 (line 9). The gate then energized relay 40. Tripping takes place and is maintained until the fault has disappeared and an additional period equal to T/2 has elapsed.

Figure 7:
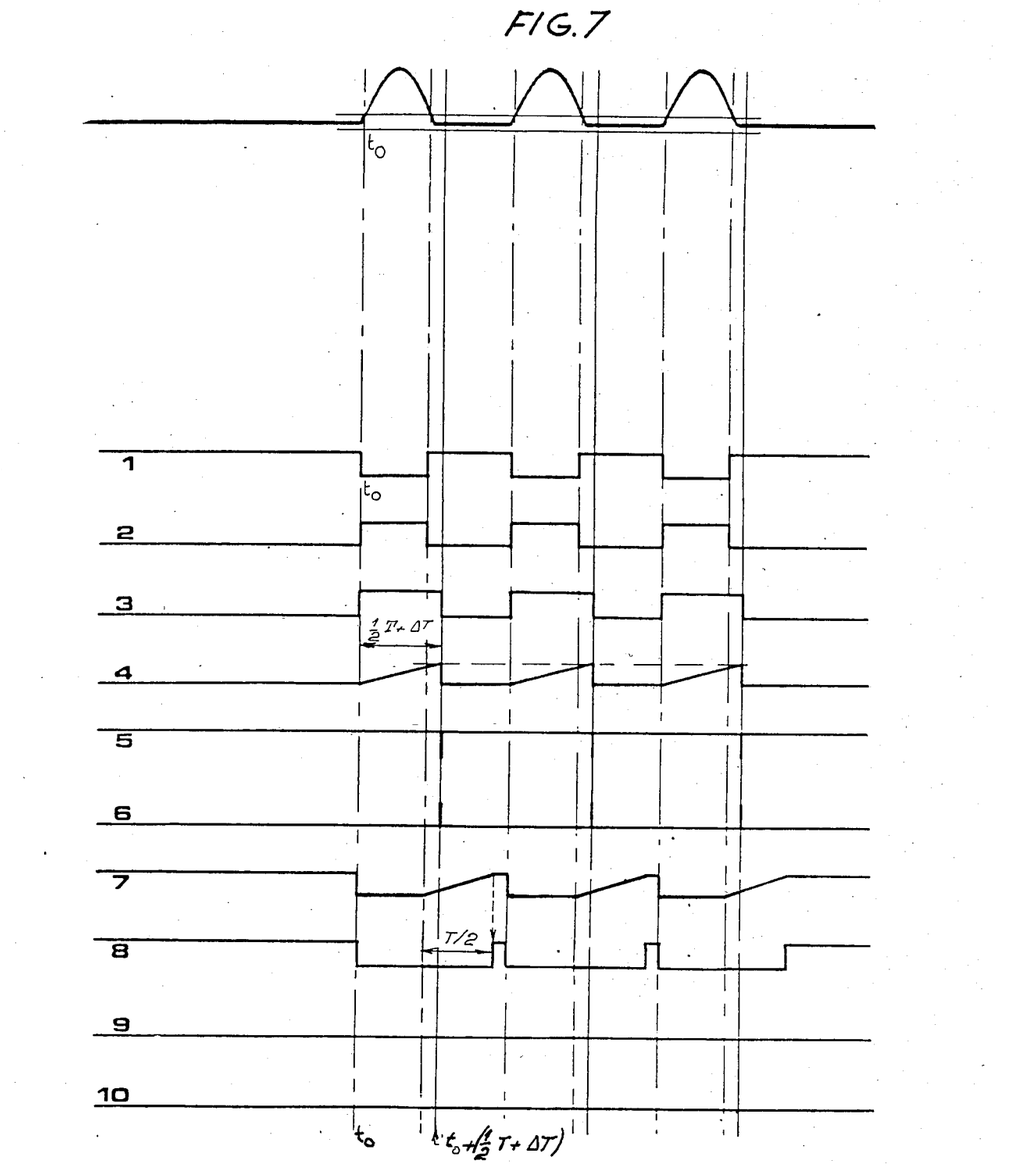
FIGS. 7, 8 and 9 are timing diagrams showing the evolution as a function of time of the voltages which appear at the points identified by the numbers 1 to 10 in FIGS. 4, 5 and 6, respectively in the case of detection of a magnetizing current under transitory conditions, of a short circuit under permanent conditions and of a short circuit current under asymmetric operating conditions.

On the contrary, in the case of a magnetizing current under transitory conditions, having the shape shown on the line at the top of FIG. 7, memory 22 is cleared at time $t_o+\frac{1}{2}T+\Delta T$, as shown in line 3, on the appearance of an output pulse from the circuit 34 (line 6). At no time is there writing in memory 52, since the circuit 44 does not provide any output (line 9) because its two inputs are never energized simultaneously. In fact, a detection signal appears at the output of the detector (line 1) only during each half wave of the magnetizing current and the output signal of timer 24 (line 5) does not appear until after the end of this half wave.

Figure 9:
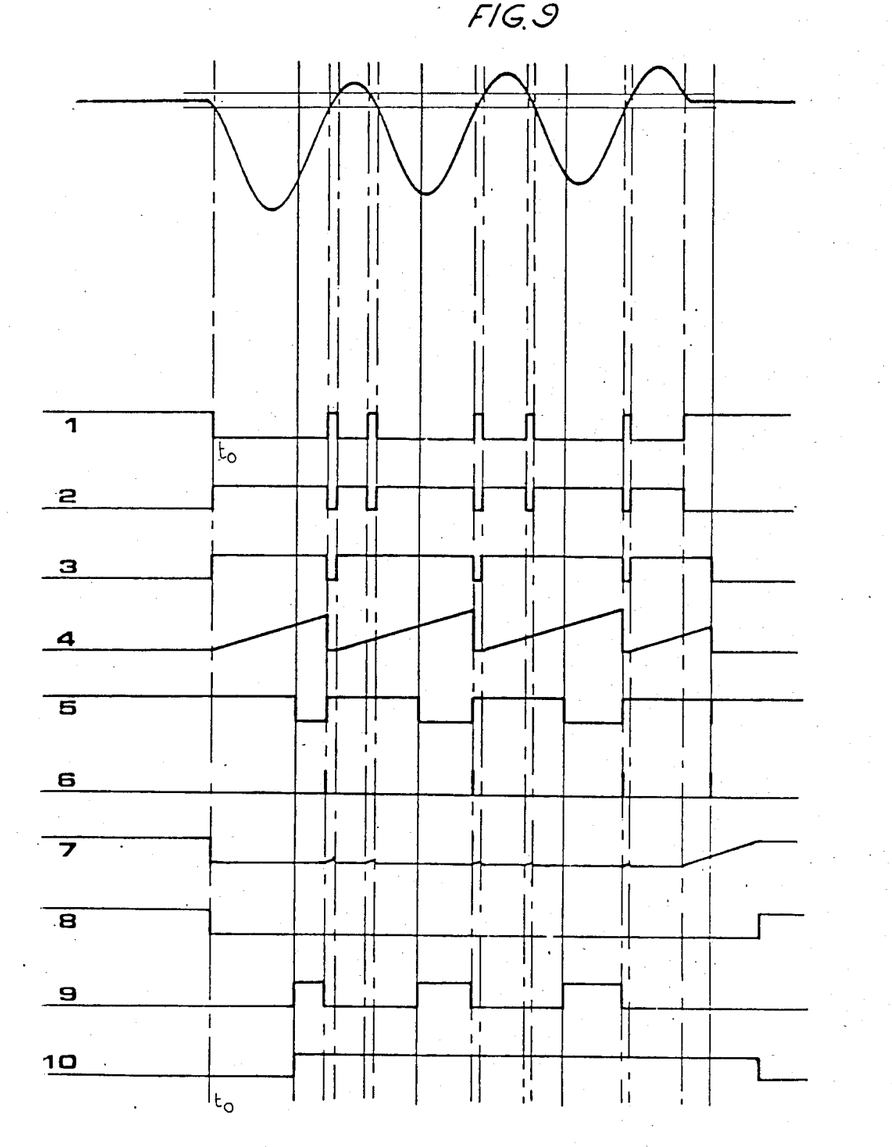

Finally, in the case of a short circuit current under assymetric conditions, it can be seen that, even for considerable assymmetry, there is again writing in memory 52 without reset, even for a strong magnetizing current component.

I claim:

1. Selective overcurrent protection device for AC operation, comprising:
    means for rectifying the two half waves;
    means for comparing the instantaneous value of the rectified current and a threshold value (s) and means for making, in the case of overshoot, a new comparison at the end of a time equal to $\Delta T$ after overshoot, T being the nominal period of the AC current and $\Delta T$ a fraction of T of the order of a tenth, said means for making a new comparison comprising memory means for storing occurrence of the overshoot, a timer of a duration equal to $(\frac{1}{2})T+\Delta T$ connected to the output of the memory means and a circuit, comprising an inverter for each of two inputs thereof and an AND circuit driven by those two inverted inputs, whose output is connected to a reset input of the memory means and whose inputs receive, one, a signal in case of overshoot and, the other, an output signal from the timer; and, actuating means for tripping the device if overshoot is detected during the comparison.

2. A device according to claim 1, wherein said actuating means for tripping the device comprise a second timer providing a time delay substantially equal to T/2 connected to receive the signal representative of each overshoot and whose output is connected to a clear input of a second memory having a write in input which receives the output signal from a test circuit belonging to said means for making a new comparison after a time equal to $(\frac{1}{2})T + \Delta T$ has elapsed.

3. A device according to claim 2, wherein said test circuit consists of a second circuit comprising an inverter for each of two inputs thereof and an AND circuit driven by those two inverted inputs, said second circuit having one of said inputs connected to receive the signal which is also applied to the input of the second timer and a second of said inputs connected to receive the output signal of the first timer, of duration $(\frac{1}{2})T + \Delta T$.

4. A device according to claim 1, wherein said the device comprises solid state static elements.

5. A device according to claim 4, wherein said elements comprise transistors operating alternately in cut off condition and in saturated condition.

* * * * *